May 27, 1930.  K. E. BARRETT ET AL  1,759,880
WEIGHING SCALE
Filed Sept. 21, 1925   7 Sheets-Sheet 2

K. E. Barrett and
G. K. Fuller
INVENTORS

BY Malcolm N. Barnett
ATTORNEY

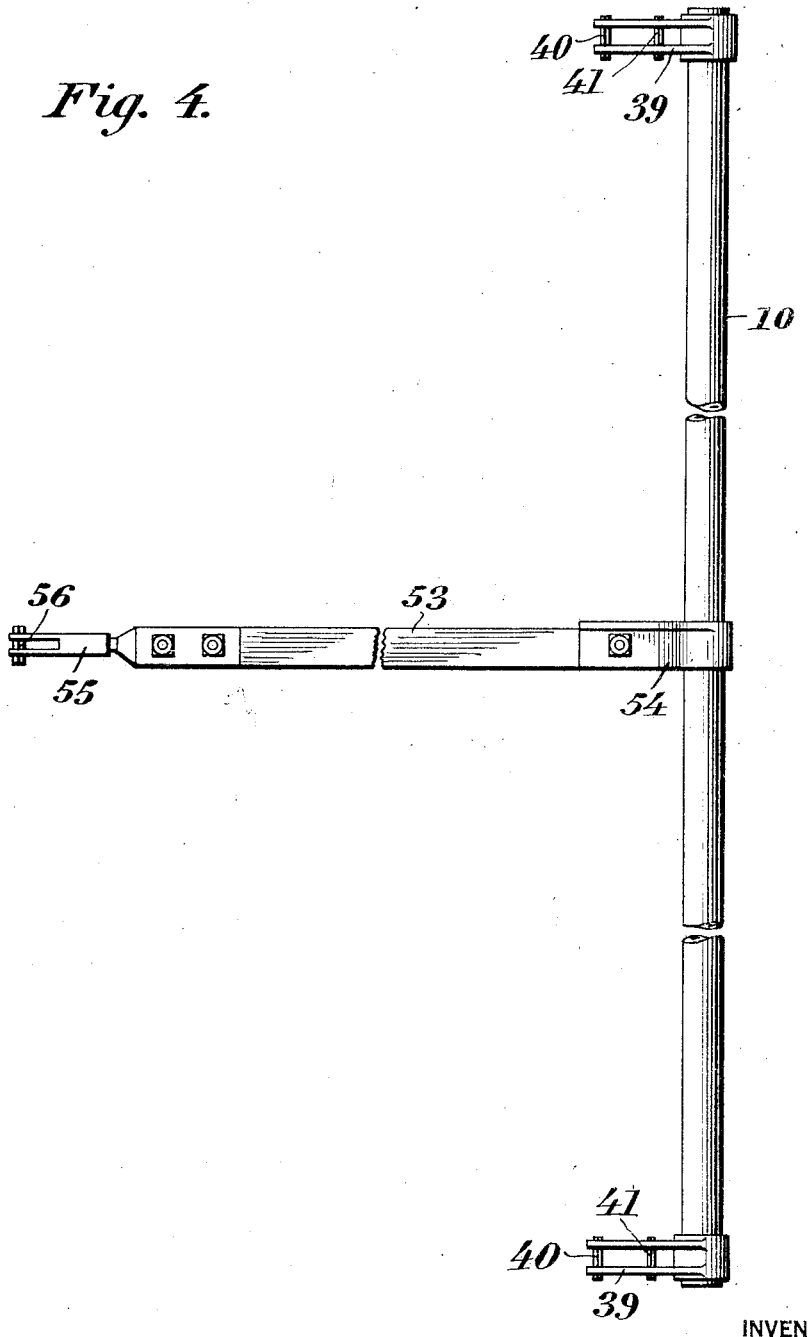

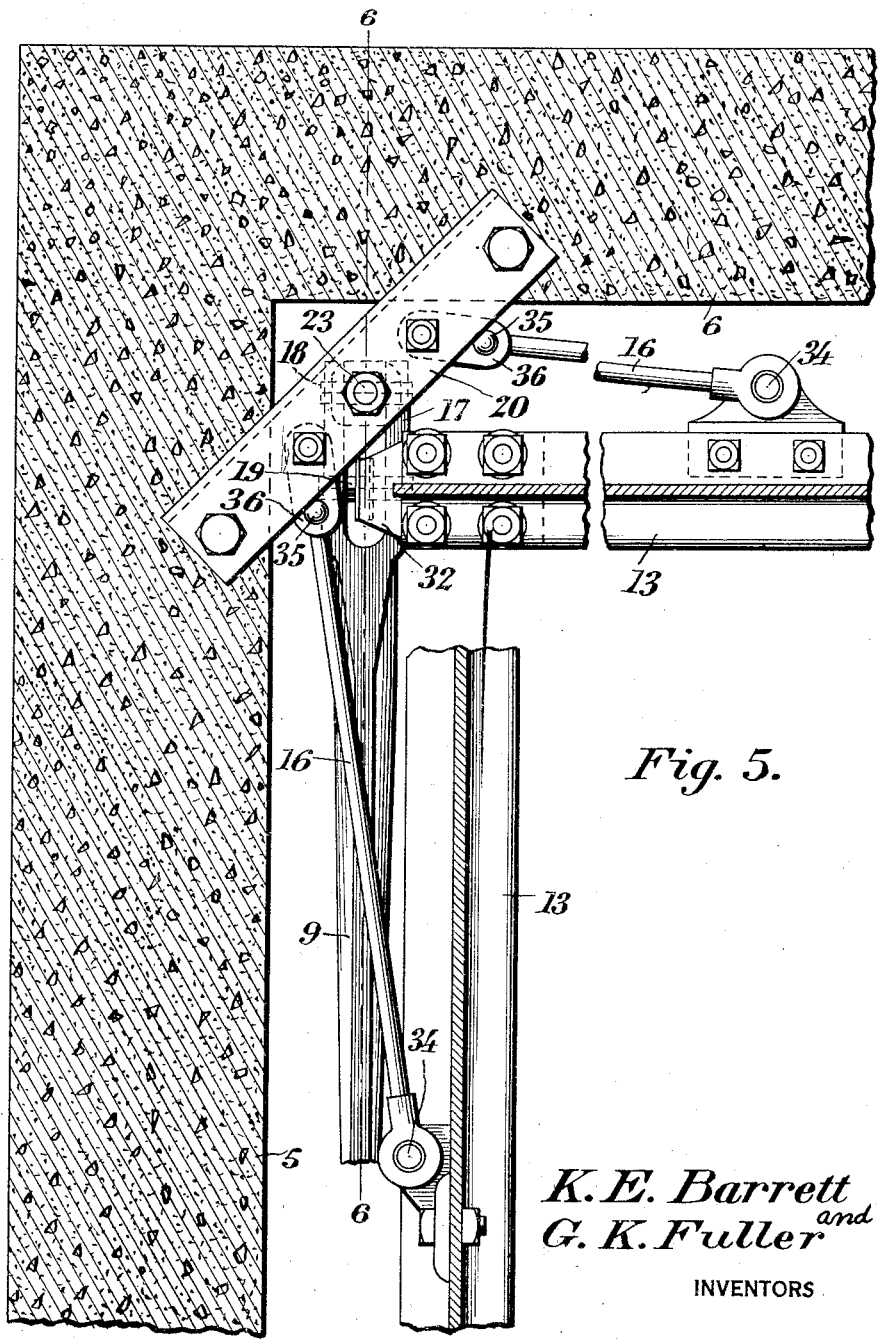

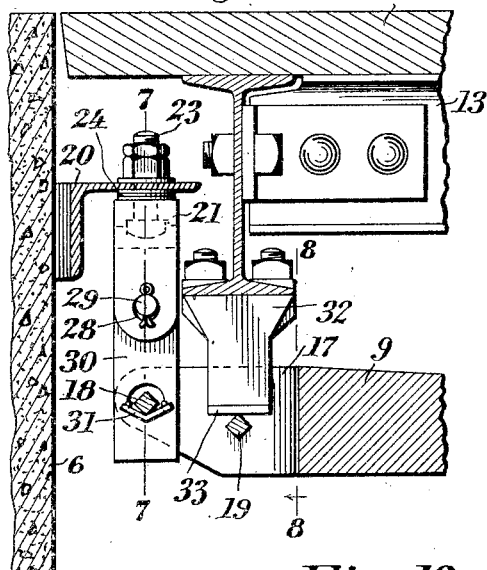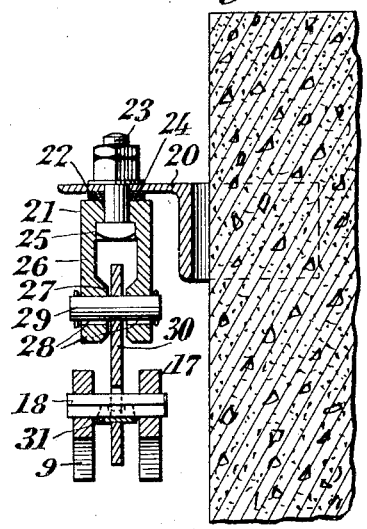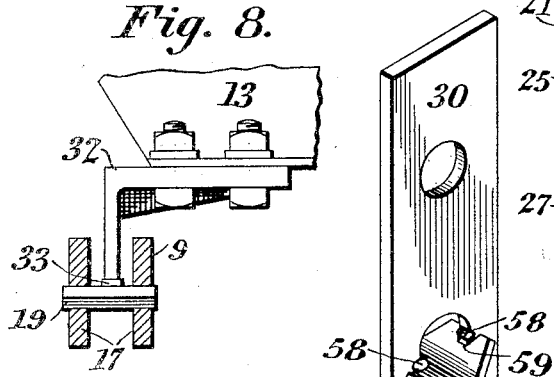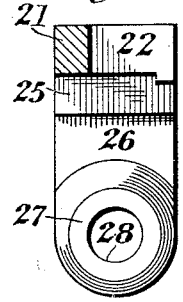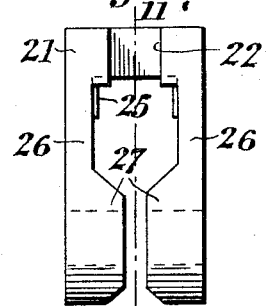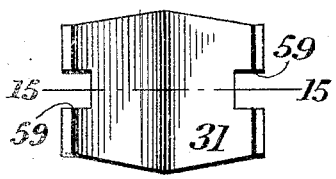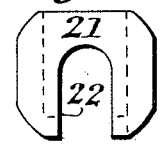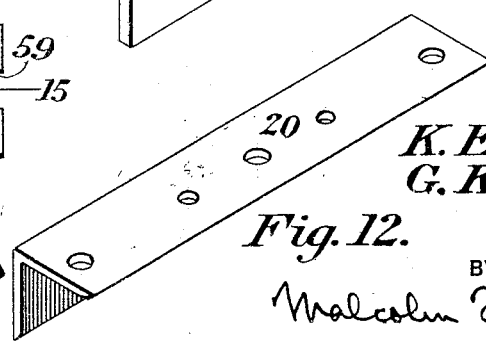

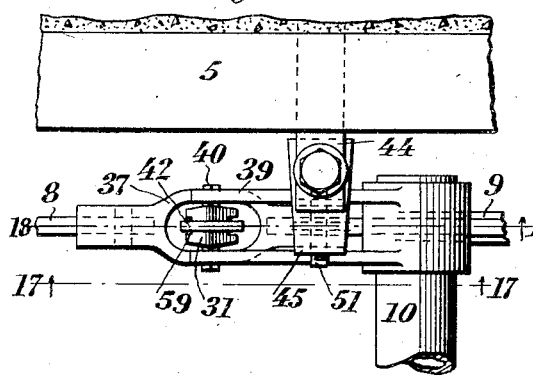
Fig. 16.
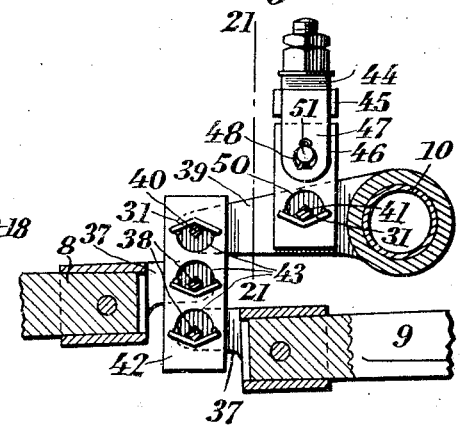
Fig. 18.
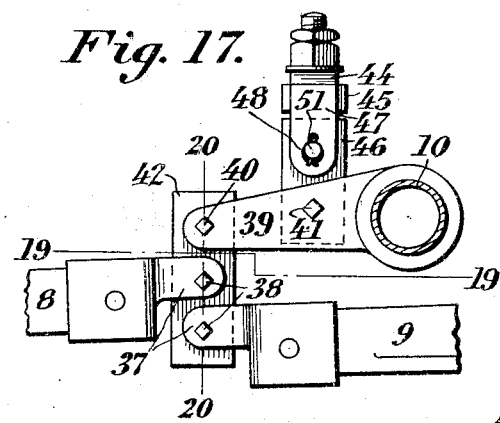
Fig. 17.
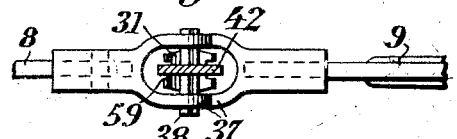
Fig. 19.
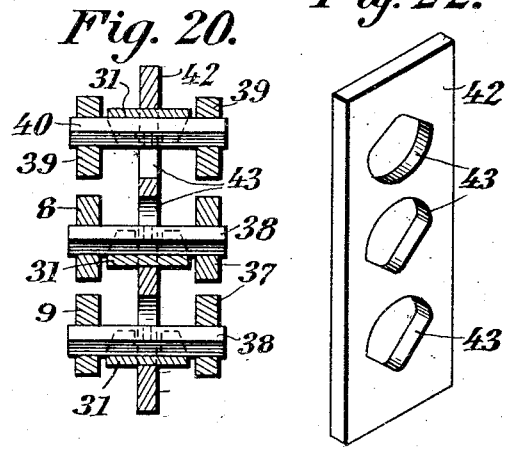
Fig. 20.
Fig. 22.
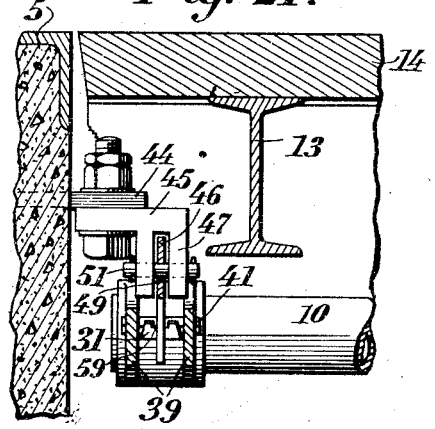
Fig. 21.
K. E. Barrett and G. K. Fuller
INVENTORS Patented May 27, 1930

1,759,880

UNITED STATES PATENT OFFICE

KARL E. BARRETT AND GLENN K. FULLER, OF SHERBROOKE, QUEBEC, CANADA, ASSIGNORS TO THE B. S. & M. SCALE COMPANY LIMITED, OF SHERBROOKE, CANADA, A CORPORATION OF CANADA

WEIGHING SCALE

Application filed September 21, 1925, Serial No. 57,723, and in Canada August 17, 1925.

This invention relates to improvements in weighing scales, and more especially in some of its details to improvements in wagon scales.

It is a general object of the invention to provide an improved scale of the class mentioned, in which simplicity of construction, interchangeability of parts, ease of repair and replacement of parts, and economies of production cost are attained.

Another object of the invention is the provision of an improved scale in which refinement in construction is employed, resulting in enduring accuracy, and in which accuracy in operation is undisturbed by a slight disalignment of parts, either due to structural or assembling inaccuracies or as a result of severe usage or accident.

In carrying out the objects of our present invention we have produced a scale composed of standardized units so devised as to be readily assembled with a minimum amount of labor. For instance, short lengths of angle irons are set diagonally in the corners of the scale base. To these angles are connected the ends of the main levers and the check rods. While the main levers are castings, such levers are connected to an extension lever composed of a length of pipe having fixed intermediate its length a laterally extending angle iron. Thus, the extension lever is of one piece T-form, with the tip of the angle iron portion thereof adapted to be connected to the weight indicating mechanism. The loops heretofore used in scales for connecting the knife edge pivots have been dispensed with, and in lieu thereof we utilize perforated plates.

Other objects will be in part obvious in connection with the following description, and will be in part pointed out in connection therewith.

The invention accordingly comprises the features of construction, combination of elements, and arrangement of parts which will be exemplified in the construction hereinafter set forth, and the scope of the application of which will be indicated in the claims.

For a complete understanding of the nature and objects of the invention, reference is had to the following detailed description and to the accompanying drawings, wherein:—

Fig. 4 is a detail plan of the extension lever on a somewhat larger scale;

Fig. 5 is a horizontal section through one corner of the scale showing, in plan, the arrangement of one of the main levers and associated parts;

Fig. 6 is a vertical section taken approximately on the line 6—6 of Fig. 5, showing the manner of supporting the butt of one of the main levers, and for also transmitting load stresses from the load-receiving platform to the load pivot of such lever;

Fig. 7 is a vertical section taken approximately on the line 7—7 of Fig. 6;

Fig. 8 is a similar view taken on the line 8—8 of Fig. 6, showing the platform bearing;

Fig. 9 is a detail front view of one of the corner irons used for supporting the butt of the main levers;

Fig. 10 is a plan of the structure shown in Fig. 9;

Fig. 11 is a vertical section taken on the line 11—11 of Fig. 9;

Fig. 12 is a detail view of the corner angle;

Fig. 13 is a similar view of the fulcrum plate;

Fig. 14 is a plan of one of the bearing plates;

Fig. 15 is a section therethrough taken approximately on the line 15—15 of Fig. 14;

Fig. 16 is a plan of the center connection between the levers;

Fig. 17 is an elevation thereof, as seen from the line 17—17 of Fig. 16;

Fig. 18 is a vertical longitudinal section through the center connection of the levers, taken approximately on the line 18—18 of Fig. 16, parts being shown in elevation;

Fig. 19 is a horizontal section taken approximately on the line 19—19 of Fig. 17, showing the adjoining ends of the main levers;

Fig. 20 is a vertical transverse section taken approximately on the line 20—20 of Fig. 17;

Fig. 21 is a similar view taken approximately on the line 21—21 of Fig. 18, showing the method of supporting the ends of the extension lever;

Fig. 22 is a detail view of the plate used to connect the levers, the plate being shown in the form it is made prior to receiving the pivot bearings;

Figure 1:
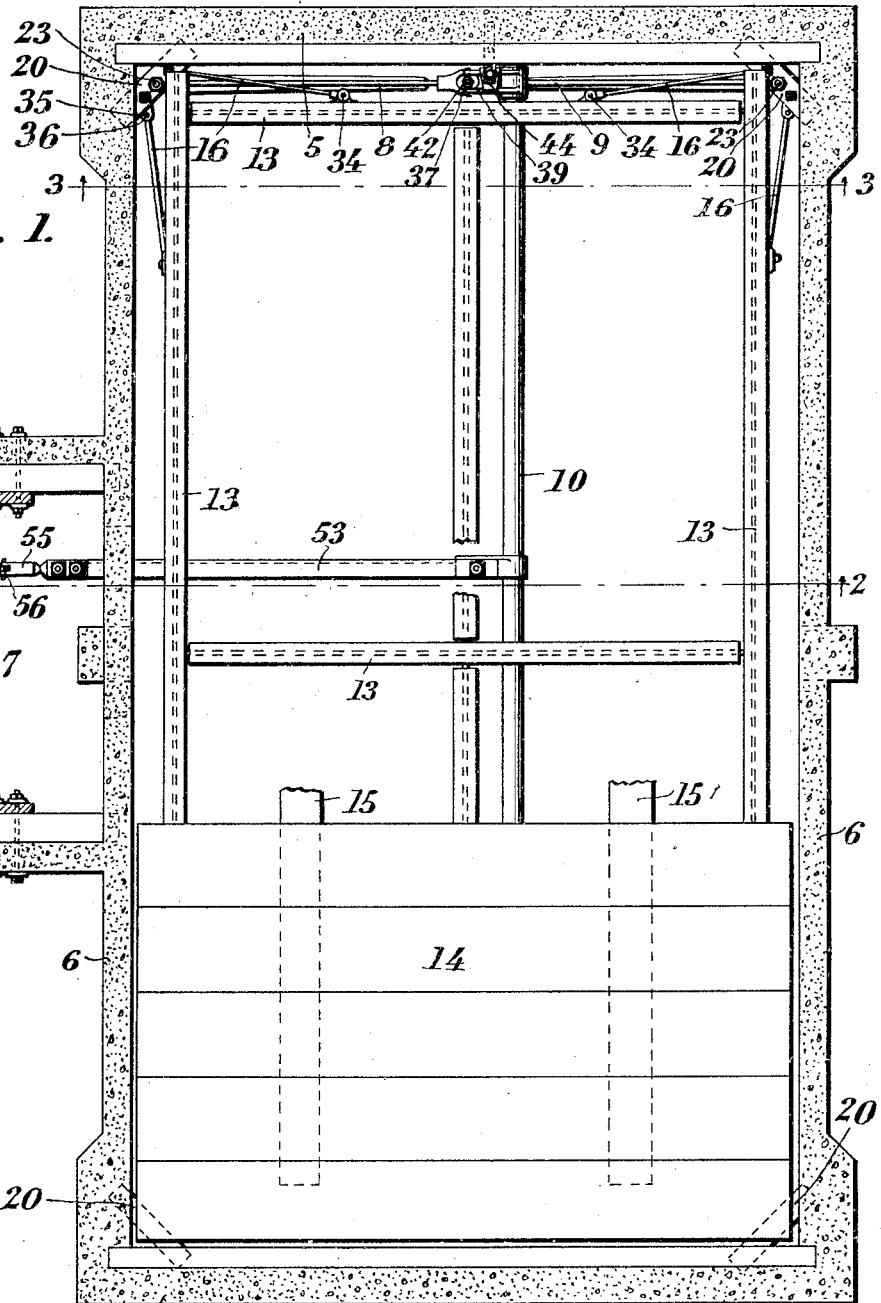
Figure 1 is a plan of a scale constructed in accordance with our invention, parts being broken away to show the underlying structure.

Referring now to the drawings for a detailed description of the embodiment of our invention there shown and to the general layout of Fig. 1, the foundation for the scale consists of a monolithic concrete structure composed of end walls 5 and side walls 6 that are set into a pit in the ground. Should it be so desired, however, any other material such as wood or metal can be used in lieu of concrete, as the parts of the scale which are carried by the foundation are readily adapted for installation in any of the approved building materials without alteration. Formed adjacent to one of the side walls 6 is a pocket 7 for supporting the weight-indicating mechanism, as is customary in machines of this character.

Two spaced pairs of main levers 8 and 9 are employed to receive the superposed load and transmit the same to an extension lever 10, which in turn transmits a predetermined reduction of the load to the weight-indicating mechanism (not shown). The main levers which are fulcrumed at their outer or butt ends from means carried by the corners of the foundation are connected to the extension lever by improved means which enable the pivots of the adjoining levers to be arranged in vertical alignment. The extension lever, which receives the load from the main levers reduced by their multiplication, is fulcrumed from means carried by the end walls 5.

In the present design the levers are all of the second order. All of the levers move downwardly under the influence of the load and the levers receiving the load directly from the platform and the extension lever which transmits the load to the weight-indicating mechanism, all transmit their power by a downward push instead of a downward pull; therefore, the use of an even lever of the first order connected to a pull-up lever of the first order is not necessary, and hence the bottom of the scale pit can be made flat without any depressions. Such pit will also be comparatively shallow.

Positioned above the levers is a rectangular frame composed of girders 13 suitably fastened together. This frame is designed to carry a platform 14, the upper surface of which lies flush with the top of the walls of the foundation. If so desired the platform can be composed of planks laid transversely the longitudinal girders of the frame, such planks being tied together by means of stringers 15. The load stresses from the platform are transmitted through the girders to the main levers by means of connections shown in Figs. 3, 5, 6 and 8, and to be described. As is customary with devices of this character, the platform is provided with suitable check rods 16.

Each main lever is in the nature of a single web that has its butt end bifurcated to provide spaced side walls 17 for supporting a pair of spaced knife edge pivots 18 and 19, the former being positioned near the end of the lever and functioning as the fulcrum pivot, while the latter pivot, which is located directly beneath the end girder of the platform, serves as the load pivot.

For the purpose of supporting the butt end of the main levers an angle iron 20 is fixed diagonally in each corner of the foundation at a suitable distance below the top thereof (see Figs. 5, 6 and 7). The disposition of the angles is such that a space is formed intermediate their ends in which space can be mounted certain parts of the scale, as will be described.

Depending from the angle iron 20, and rigidly attached thereto at a point equidistant from the two adjoining walls of the scale, is a corner iron or bracket 21. This member which is shown in detail in Figs. 6, 7, 9, 10 and 11 has a slot 22 formed in its top, through which slot is inserted a bolt 23 used for securing the bracket to the angle iron 20. As it is desirable that the brackets in all of the corners of the scale be positioned at substantially the same elevation, washers 24 can be inserted between the top of the bracket and the angle to equalize for any discrepancies in the positioning of the angle iron 20 in the foundation walls.

A recess 25 is formed in the bracket 21 for receiving the rectangular head of the bolt 23. The design of this recess is such that when the bolt is secured in place it is impossible for the bracket 21 to slide off the head of the bolt.

We prefer to construct the bracket 21 in the form shown, so as to provide a bifurcated body having spaced sides 26, the lower portions of which terminate in annular bosses 27. Alined openings 28 are formed in the bosses 27, through which openings is passed a pin 29 from which is suspended a rectangular plate 30 (see Fig. 13.) The plate 30 is attached to the butt end of the main lever, and for this purpose the plate has mounted therein, near its lower edge, a V-shaped bearing 31 adapted to engage with the lever pivot 18 and support the same.

The bearing 31 is loosely seated in a correspondingly shaped seat in the plate, being secured in position by lugs 58 overlying the adjacent edge of the bearing, such lugs being struck up from the plate after the bearing is placed in position therein. The bearing is notched at the side thereof, as indicated at 59, for the reception of the sides of the plate adjacent the bearing seat so as to prevent the bearing from sliding longitudinally out of its seat. The notches 59 are wide enough so the edges thereof engage loosely with the sides of the plate and the retaining lugs 58 are spaced sufficiently above the edge of the bearing 31 to permit freedom of rocking movement so the bearing automatically adjusts itself to the proper position for contacting with the knife edge pivot. In this manner the bearing is self-compensating and parts thereof will always be properly alined irrespective of inaccuracies in the proportions of parts and assembly thereof, and this alinement will be retained irrespective of severe usage or wear. The seat of the bearing in the plates being quite narrow, readily permits slight rocking movement of the bearing therein. As indicated in the drawings, this type of self-compensating bearing is preferably employed throughout the scale construction.

Load stresses are transmitted from the platform to the main lever through an L-shaped bearing 32 carried by the end girders of the frame. In order to provide a wearing surface, the lower limb of the bearing 32 is provided with a hardened steel plate 33 for engaging with the knife edge pivot 19 of the main lever (see Figs. 6 and 8), such plate being relatively long and disposed in the space between the side walls 17 of the lever.

An improved checking arrangement is provided whereby the main levers and load receiving platform are held in properly centered position. This checking system includes check lugs 34 bolted to the girders 13 near the corners of the frame. The check rods 16 have their ends provided with eyes, whereby the ends of the rods which are attached to the girders 13 may engage the lugs 34, while their opposite ends can be pivotally connected by means of pins 35 passed through plates 36 bolted to the angles 20 (see Figs. 1 and 5).

Bifurcated nose irons 37, having mounted therein knife edge pivots 38, are attached to the ends of levers 8 and 9, the ends of such levers terminating adjacent to the longitudinal axis of the scale, with the extremity of one of the levers overlying the extremity of the other lever.

The extension lever 10 comprises a main body portion in the form of a pipe or tubular rod having a length slightly less than the length of the scale pit. This lever is positioned directly below the frame of the platform with the ends of the lever overlying the adjoining ends of the levers 8 and 9.

Affixed to each end of the lever 10, so as to be disposed above the overlying adjoining ends of the main levers is a lateral extension 39. This extension is shown as comprising a pair of spaced arms in which are transversely mounted, two spaced apart knife edge pivots 40 and 41. The pivot 40 is positioned near the extremity of the extension 39 and is adapted to be operatively connected to the free ends of the main levers, while the pivot 41 is positioned intermediate the length of said extension, and is adapted to be connected to the supporting means of the lever 10.

The connection between the adjoining ends of the levers, 8, 9 and 10 includes a plate 42 disposed between the bifurcated ends of such levers and adapted to receive the knife edge pivots carried thereby (see Figs. 16 to 22 inclusive). For this purpose the plate 42 is formed with a plurality of openings 43 through which project the pivots of the levers, such pivots engaging with compensating bearings similar in form to the bearings 31 previously described, which bearings are mounted in the openings in the plates. It will be noticed that the bearing for the pivot 40 of the lever 10 is disposed in its opening in a direction reversed to the bearings in the plate for the levers 8 and 9.

Figure 23:
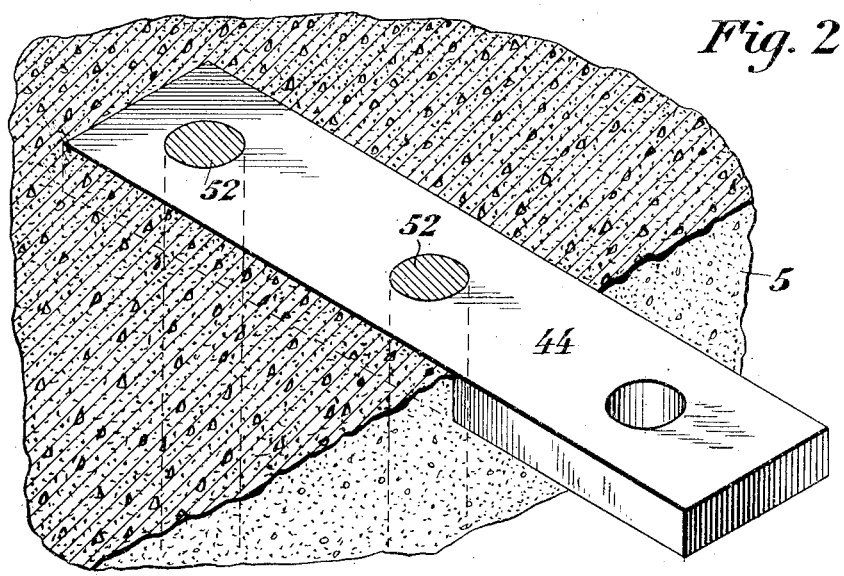
Fig. 23 is a detail view showing the supporting plate for the extension lever anchored in the base of the scale.
Figure 24:
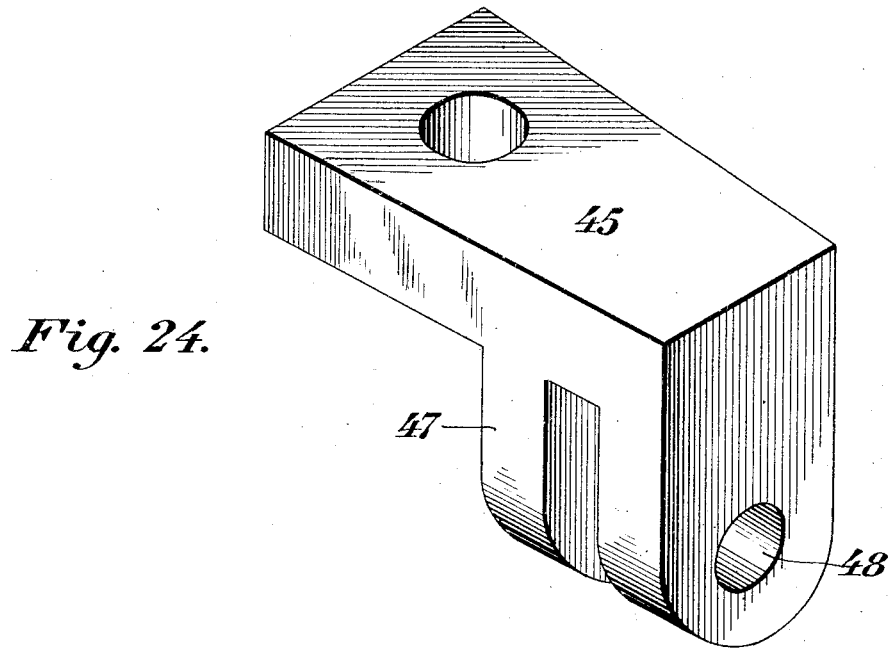
Fig. 24 is a detail view of one of the brackets used for supporting the ends of the extension lever.

Projecting outwardly from the end wall 5 of the scale base, and overlying the pivot 41 of the extension lever 10, is a plate 44 formed of a suitable length of bar iron or steel. In the present design, two of these plates are used, one at each end of the scale, the plates being anchored in the foundation by means of spaced bolts 52 (see Fig. 23).

Bolted to the projecting end of the plate 44 is a bracket 45 having a depending bifurcated portion 47 in which is inserted the upper part of a plate 46 similar in design to the plate 30 previously described. Alined openings 48 are formed in the portion 47 of the bracket, while the plate 46 is provided with spaced openings 49 and 50. The opening 49 is round and adapted to register with the openings 48. A pin 51 is passed through the alined openings of the bracket and plate, and such pin serves as means by which the extension lever is fulcrumed, as will be readily understood. The opening 50 has mounted therein a compensating bearing that engages with the pivot 41 in the lateral extension of the lever 10.

Figure 2:
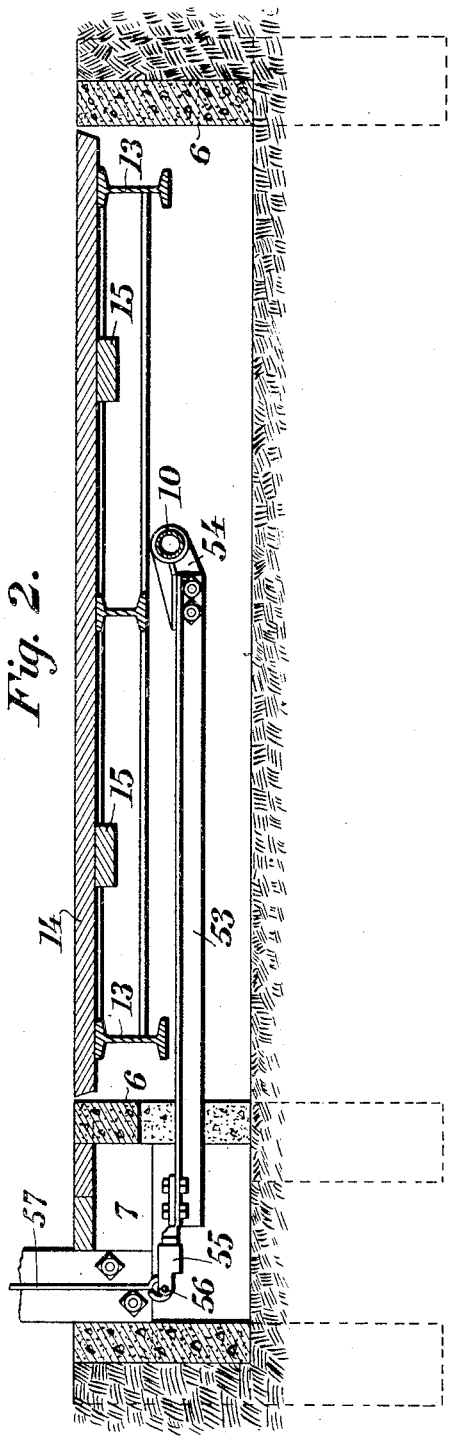
Fig. 2 is a vertical transverse section taken approximately on the line 2—2 of Fig. 1, showing the extension lever.
Figure 3:
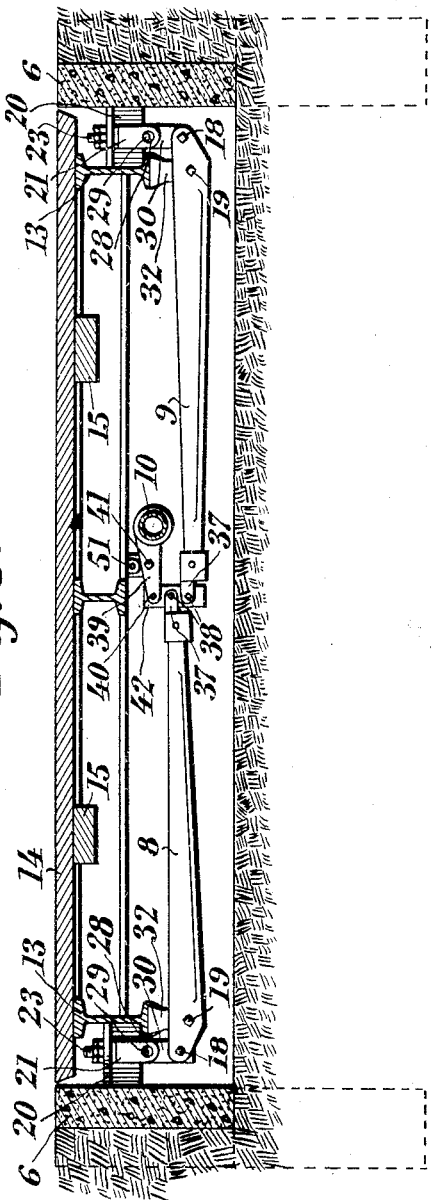
Fig. 3 is a vertical transverse section taken approximately on the line 3—3 of Fig. 1, showing the arrangement of the main levers.

Load stresses from the main levers 8 and 9 are transmitted to the ends of the lever 10 through the connections just described. In order to conduct such load stresses to the weight-indicating mechanism we have, in the present instance, utilized a single arm 53 projecting laterally from the body portion of the lever 10, intermediate the length thereof, and integrally formed therewith. Referring to Figs. 2 and 4, it will be noticed that the arm 53 is constructed of a suitable length of angle iron which is bolted to a bracket 54 sleeved on the body of the lever, the tip of the arm 53 being provided with a nose iron 55 carrying a knife edge pivot 56 for receiving the lower hooked end of a load-transmitting rod 57. In its present form it will be seen that the extension lever 10 is substantially T-shaped. This design, it has been found, materially reduces manufacturing and installation costs, and the lever system functions satisfactorily in service.

From the foregoing it will be seen that assembly or disassembly of the various elements is provided for and repair and replacement of parts facilitated. Furthermore, it is to be noted that the relative position of all the lever pivots enables us to obtain a high multiplication of leverage in the lever system herein shown and described.

Since certain changes may be made in the above construction, and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What we claim is:—

1. In a platform scale, a base, supports carried diagonally across the corners of the base, levers, and pivotally mounted plates connecting the levers with the said supports.

2. In a platform scale, a wall of concrete, supports embedded diagonally across the corners of the concrete wall, levers, and pivotally mounted plates connecting the butt ends of the levers with the said supports.

3. In a platform scale, a base including side walls, an angle iron carried diagonally across the corners of the said side walls, a load transmitting lever, a bracket depending from the said angle iron, and a plate pivotally connected to the bracket and said lever.

4. In a weighing scale and in combination with the base thereof, means for supporting the lever system including lengths of commercial angle iron diagonally spanning the corners of the scale base, one side of the angle being vertically disposed, and the other side of the angle being horizontally disposed, and perforations formed in the horizontal side of the said angles.

5. In a weighing scale and in combination with the base thereof, means for supporting the lever system including a length of commercial angle iron diagonally spanning each corner of the base, one side of the angle being vertically disposed and positioned adjacent to the apex of the corner of the base, the other side of the angle being horizontally disposed, perforations formed in the horizontal side of the said angle and a bolt passed through one of the perforations and carrying a lever supporting bracket.

6. In a scale, a lever having a bifurcated end, a bifurcated supporting bracket overlying the end of said lever, and a plate disposed between said bifurcations for connecting the lever to the bracket.

7. In a scale, a lever having a bifurcated end provided with a pivot, a bifurcated supporting bracket overlying the end of said lever, and a plate disposed between the said bifurcations for connecting the lever to the bracket, said plate having an opening formed therein and a compensating bearing mounted in said opening for receiving the lever pivot.

8. In a scale, the combination with a base, a platform and a system of levers, of supporting means for all of the levers including bifurcated brackets carried by the base, and perforated plates suspended from the brackets and connected to the levers.

9. In a scale, the combination with spaced pairs of main levers having overlying adjoining ends, an extension lever disposed at right angles to said main levers, and an arm projecting laterally from the extension lever and overlying the adjoining ends of the main levers.

10. In a scale, the combination with spaced pairs of main levers having overlying adjoining ends, an extension lever disposed at right angles to said main levers, an arm projecting laterally from the extension lever and overlying the adjoining ends of the main levers, and a plate connecting the overlying ends of the levers.

11. In a scale, the combination with spaced pairs of main levers having overlying adjoining ends, an extension lever disposed at right angles to said main levers, an arm projecting laterally from each end of the extension lever and adapted to overlie the adjoining ends of the main levers, and means for connecting the overlying ends of the levers.

12. In a scale, the combination with spaced pairs of main levers having overlying bifurcated ends, an extension lever disposed at right angles to said main levers, a bifurcated arm projecting laterally from each end of the extension lever and adapted to overlie the adjoining ends of the main levers, and a single connecting plate mounted between the bifurcations of the levers.

13. In a scale, the combination with spaced pairs of main levers having overlying bifurcated ends carrying pivots, an extension lever disposed at right angles to said main levers, a bifurcated arm projecting laterally from each end of the extension lever, said arm carrying a pivot adapted to overlie and aline with the pivots in the adjoining ends of the main levers, and a perforated plate mounted between the bifurcated ends of the levers and supporting said pivots.

14. In a scale, the combination with spaced pairs of main levers having overlying bifurcated ends carrying pivots, an extension lever disposed at right angles to said main levers, a bifurcated arm projecting laterally from each end of the extension lever, said arm carrying a pivot adapted to overlie and aline with the pivots in the adjoining ends of the main levers, and a plate mounted between the bifurcated ends of the levers, said plate having openings formed therein and a bearing mounted in each opening for supporting the lever pivots.

15. In a scale, the combination with spaced pairs of main levers having overlying adjoining ends connected for transmitting load stresses, of a load transmitting member in the form of a T-shaped extension lever connected to the ends of the main levers.

16. In a scale, the combination with spaced pairs of main levers having overlying adjoining ends, an extension lever of T-form having lateral arms overlying the adjoining ends of the main levers, and a single connecting element between the overlying ends of the levers.

17. In a scale, the combination with a foundation including side walls, of spaced pairs of main levers disposed adjacent opposite walls of the scale, the free end of the main levers overlying one another, means carried by the side walls for supporting the opposite ends of the main levers, an extension lever overlying the main levers, said extension lever being disposed at right angles to said main levers and being substantially T-shaped in form, means carried by the side walls for supporting the extreme ends of the extension lever, and an arm projecting laterally from each end of the extension lever and adapted to overlie the adjoining ends of the main levers.

18. In a scale, the combination with a foundation including side walls, of spaced pairs of main levers disposed adjacent opposite walls of the scale, the free ends of the main levers overlying one another, means carried by the side walls for supporting the opposite ends of the said main levers, an extension lever overlying the main levers, said extension lever being disposed at right angles to said main levers and being substantially T-shaped in form, means carried by the side walls for supporting the extreme ends of the extension lever, an arm projecting laterally from each end of the extension lever and adapted to overlie the adjoining ends of the main levers, and a plate for connecting the adjoining ends of the levers together.

19. In a scale, the combination with spaced pairs of main levers having overlying adjoining ends, an extension lever disposed at right angles to said main levers, an arm projecting laterally from each end of the extension lever and adapted to overlie the adjoining ends of the main levers, means for connecting the overlying ends of the levers, and supporting means connected to said extension lever arms adjacent to said lever connecting means.

20. In a scale, the combination with a plurality of levers having load transmitting pivots overlying one another, said pivots being carried by spaced-apart arms of the levers, and means for connecting said pivots including a plate disposed between said arms.

21. In a scale, the combination with a plurality of levers having load transmitting pivots arranged in vertical alinement, said pivots being carried by spaced-apart webs of the levers, and means for connecting said pivots including a perforated plate disposed between said webs and having bearing surfaces mounted in said perforations for receiving said pivots.

22. A scale lever having the form of the letter T, the main body portion of which is tubular, the lateral extension of which is angular, and bifurcated arms extending from the extreme ends of the tubular portion.

23. A scale lever having the form of the letter T, the main body of which is tubular, the lateral extension of which is angular, bifurcated arms extending from the extreme ends of the tubular portion, a bifurcated tip formed on the lateral extension, and pivots mounted in said bifurcated portions.

KARL E. BARRETT.
GLENN K. FULLER.